H. Wright,
Pitcher Top.

N° 42,712. Patented May 10, 1864.

Witnesses
A. S. Nicholson
Edward Nicholson

Inventor
Homer Wright

UNITED STATES PATENT OFFICE.

HOMER WRIGHT, OF PITTSBURG, PENNSYLVANIA.

IMPROVEMENT IN JUG-TOPS.

Specification forming part of Letters Patent No. 42,712, dated May 10, 1864.

*To all whom it may concern:*

Be it known that I, HOMER WRIGHT, of Pittsburg, in the county of Allegheny and State of Pennsylvania, have invented a new and useful Improvement in Jug-Tops; and I do hereby declare that the following is a full, clear, and exact description of the same, reference being had to the accompanying drawings, making a part of this specification, in which—

Figure 1:
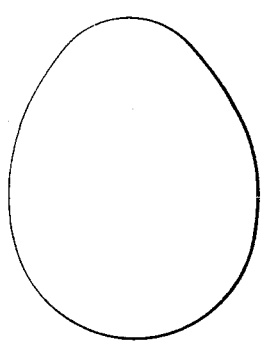
Figure 2:
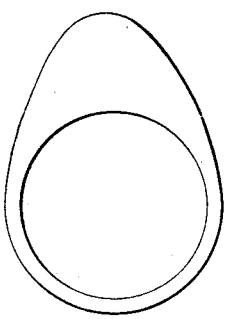
Figure 3:
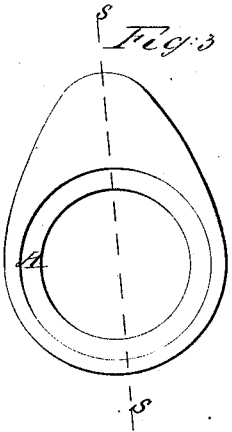
Figure 4:
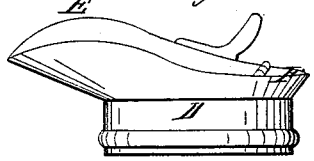
Figure 5:
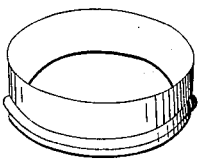
Figure 6:
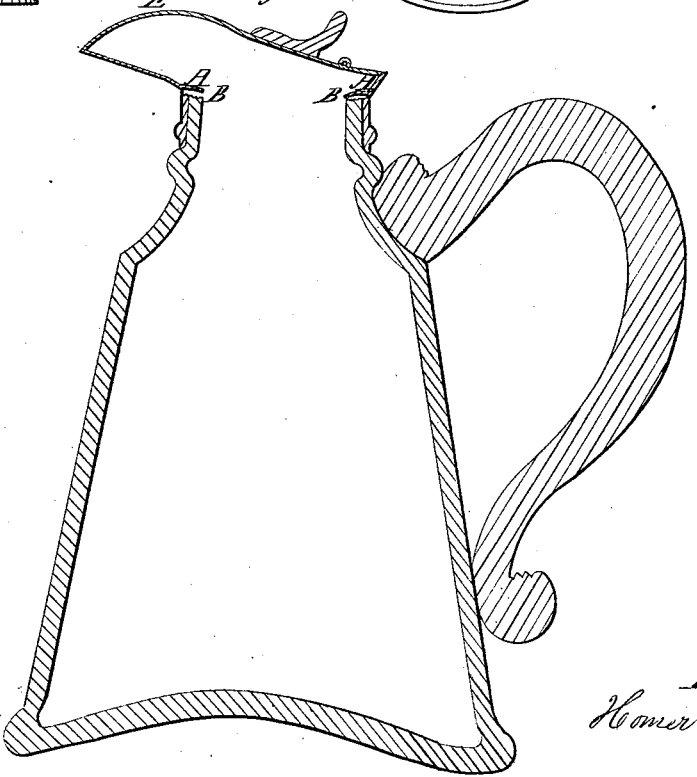

Figure 1 is an outline diagram of the tin blank used in forming my invention. Fig. 2 is a view of the same after being formed into the desired shape. Fig. 3 is a view the same as Fig. 2, with a round opening in the center. Fig. 4 is a side view of a completed jug-top. Fig. 5 is a view of a strip of tin bent in a circle with the ends united. Fig. 6 is a diagram of a jug and top, showing their relative positions when united.

Similar letters of reference indicate corresponding parts in the several figures.

This invention relates to an improvement in an article of manufacture known as a "jug-top," which, when applied with cement or plaster to the necks of glass or queensware jugs, used in domestic economy for holding sirup, cream, or other liquids, forms a neat and comely top, and has for its object the forming or making the body-section of a tin jug-top from one piece of sheet-tin without seam, thereby adding greatly to its strength and comeliness, and also permitting of the formation of a margin or rim within the body, so shaped as to rest snugly upon the top of the neck of the jug, thereby protecting the cement or plaster from contact with the liquid in the jug.

To enable those skilled in the art to fully understand and construct my invention, I will proceed to describe it.

I take an ordinary sheet of tin-plate and cut therefrom a blank of the general size and form represented by Fig. 1. I next transfer this blank to a properly-shaped die and stamp or press it into the general form and shape represented at Fig. 2 and in red outline at Fig. 4, and also in red outline at Fig. 6, the latter being a sectional view taken in line *s s* of Fig. 3. It is now of proper form and shape. I next transfer it to a suitable die, and punch a circular opening through the bottom of said piece, leaving a margin or rim, A, Figs. 3 and 6, sufficiently broad to cover the top edge of the glass or queensware jug, as shown at B, Fig. 6. I next take a strip of tin, and, having bent it into a circular form, as shown at Fig. 5, I solder the ends together, and next solder the edge of the said tin ring to the bottom of the body of the jug-top, as seen at D, Fig. 4. With properly-shaped die and punch I next cut from tin-plate a blank to form a lid or cover E, Figs. 4 and 6, and having hinged it in the ordinary manner I next solder or unite the hinge to the body of the jug-top, as shown at F, Figs. 4 and 6. By this arrangement it will be seen that a jug-top can be made of tin having the body formed of one solid piece without seam, with an ample margin or rim within to cover and protect the glass and cement or plaster, and giving to the finished article great strength and neatness.

Having thus described my invention, what I claim as new, and desire to secure by Letters Patent, is—

Forming the body-section of a tin jug-top with the margin or rim A, Figs. 3 and 6, of one solid piece of sheet-tin without seam, all for the purpose herein substantially set forth.

HOMER WRIGHT.

Witnesses:
A. S. NICHOLSON,
J. WARD NICHOLSON.